United States Patent [19]

Zollmeyer et al.

[11] Patent Number: 4,697,662
[45] Date of Patent: Oct. 6, 1987

[54] DRIVEN AXLE FOR COMMERCIAL VEHICLES

[75] Inventors: Willi Zollmeyer, Esslingen; Friedrich Scheurer, Ostfildern, both of Fed. Rep. of Germany

[73] Assignee: Daimler-Benz Aktiengesellschaft, Stuttgart, Fed. Rep. of Germany

[21] Appl. No.: 853,944

[22] Filed: Apr. 21, 1986

[30] Foreign Application Priority Data

Apr. 19, 1985 [DE] Fed. Rep. of Germany ....... 3514146

[51] Int. Cl.⁴ ............................................. B60K 20/00
[52] U.S. Cl. ...................................... 180/71; 180/73.3
[58] Field of Search .................. 180/71, 257, 75, 75.2, 180/73.3; 267/8 R, 19 A; 301/124 R, 124 H

[56] References Cited

U.S. PATENT DOCUMENTS

| | | | |
|---|---|---|---|
| 3,157,395 | 12/1961 | Budzynski et al. | 267/19 A |
| 3,556,555 | 1/1971 | Abbott et al. | 180/71 |
| 3,770,077 | 11/1973 | Johnson | 180/71 |
| 3,952,824 | 4/1976 | Matschinsky | 180/73.3 |
| 4,171,027 | 10/1979 | Seit et al. | 180/71 |
| 4,600,072 | 7/1986 | Krude | 180/73.3 |

OTHER PUBLICATIONS

"Technical Application Comments For Double-Jointed Universal Shafts", published Jun. 1983, by the Company of Gelenkwellenbau GmbH and address of Westendhof 7-9, D 4300 Essen., pp. 78-80, in German Text & English translation thereof).

Primary Examiner—Richard A. Bertsch
Attorney, Agent, or Firm—Barnes & Thornburg

[57] ABSTRACT

An axle for commerical vehicles with wheels which are independently guided is provided which enables double-jointed universal shafts to be used. The intersection of the axes of the wheel guides is at a distance from the articulation of the wheel shaft on the wheel bearer side which is greater than the distance between the articulations of the drive shaft on the wheel bearer side and the body side. This substantially reduces the amount of axial displacement during spring deflections.

3 Claims, 4 Drawing Figures

DRIVEN AXLE FOR COMMERCIAL VEHICLES

BACKGROUND AND SUMMARY OF THE INVENTION

The present invention relates to a driven axle for vehicles having independently guided wheels. The wheel is guided by a wheel bearer and the axle has a wheel shaft mounted in the wheel bearer. A first double universal joint adjoins the wheel shaft, and has a movable and fixed side, the movable side being on the wheel bearer side. The movable side has an axial displacement path in the transverse direction of the vehicle which depends on the flexure angle of the double univeral joint. The axle also has axially displaceable drive shafts articulated between the first double universal joint and the second double universal joint.

Axles of this type are known as steerable rigid axles and are described in Fahrzeugtechnik (Vehicle Technology) 4th edition, page 280, author: Reimpell. These axles have the characteristic that, during the flexure of the double-jointed universal shafts caused by steering movements of the wheels, the drive shaft is displaced inwards in the transverse direction of the vehicle depending on the amount of steering turn or the size of the overall flexure angle. Because of this displacement movement of the drive shaft, such double-jointed universal shafts are subject to wear. This is a reason why universal joint shafts having a synchronously running fixed joint, so as to be free from displacement movements, have been installed in driven axles having independently guided wheels. The axle shafts of these wheels have to be able to follow spring deflection movements of the wheels in an essentially vertical plane. However, universal shafts equipped with synchronously running fixed joints are not suitable for commercial vehicles because of the torques transmitted in such vehicles.

The object of the invention is to provide a driven axle of the above-described type in which the drive shafts, articulated on the wheel bearer by a double universal joint, are able to compensate for spring deflection movements of the wheels to keep the longitudinal displacements of the movable side of the double universal joints negligibly small. Moreover, it is intended for the axle to be used advantageously in particular in heavy commercial vehicles.

This object is achieved in a driven axle according to the invention by providing that the distance between a center of rotation of the wheel bearer and a first double universal joint is greater than the distance between the first double universal joint and a second double universal joint. By this provision, the axial displacement of the first double universal joint is substantially reduced during flexure of the first double universal joint.

In the axle design according to the invention, during spring movements, the articulation point of the double universal joint of each double-jointed universal shaft, together with the wheel bearer, follows along a track curve determined by the wheel guide members. The local radius of curvature of this track curve is greater than the distance between the wheel bearer side and body-side articulations of the drive shafts.

During spring movements, the axial displaceability of the drive shafts enables an axial movement to be superimposed on the drive shafts during their pivoting movement about the articulation point on the body side, to axially displace the drive shafts in the opposite direction to which they are normally displaced during flexure of the double-jointed universal shafts. Moreover, preferred embodiments provide that the drive shaft parts which are displaceable relative to one another essentially remain stationary, as viewed in the axial direction, during each flexing phase of the double-jointed universal shafts.

By locating the steering axle on the movable side of the double universal joint in a further advantageous embodiment of the invention, the independently guided wheel of the axle is pivotable about a steering axle without allowing disadvantageous axial displacement within the drive shaft of the double-jointed universal shaft resulting from steering movements.

Further objects, features and advantages of the present invention will become more apparent from the following description when taken with the accompanying drawings, which show for purposes of illustration only, embodiments constructed in accordance with the present invention.

DETAILED DESCRIPTION OF THE DRAWINGS

Figure 1:
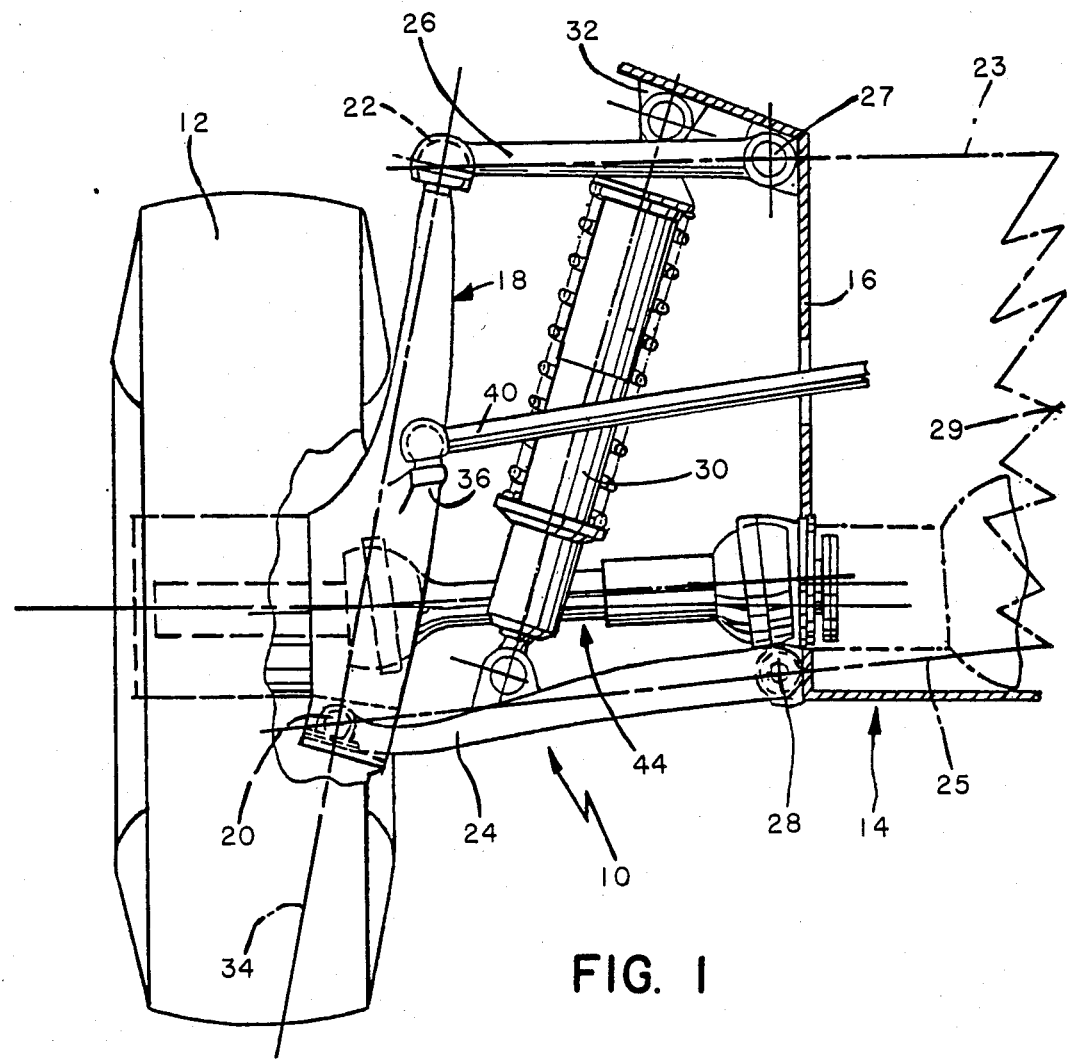
FIG. 1 shows a rear view of the wheel suspension.

FIG. 1 illustrates a preferred embodiment of a wheel suspension 10 for a steerable wheel 12 of a vehicle.

The wheel suspension 10, provided for example in a front lateral area of a side wall 16 of the vehicle body 14, has a wheel bearer 18 connected by a lower and an upper guide joint 20 and 22 to a lower guide link 24 and an upper guide link 26. The guide links 24, 26 are supported at the vehicle body 14. Both guide links 24 and 26 form transverse links with axis lines 23 and 25 which extend in the transverse direction of the vehicle. The axis lines 23 and 25 form at their point of intersection 29 the instantaneous center of rotation.

The lower guide link 24 forms, for example, a wishbone-shaped link which is pivotable about a bearing axle 28 on the vehicle body 14. The upper transverse link 26 is articulated at bearing axle 27 on the vehicle body 14.

A shock-absorber leg 30 is supported on the lower guide link 24 and is articulated at its upper end on a supporting bracket 32 on the vehicle body 14. The lower and upper guide joints 20 and 22 define a steering axle 34, indicated by a chain-dotted line, about which the wheel bearer 18 is pivoted for executing steering movements. For steering the wheel 12, the wheel bearer 18 is equipped with a track link steering arm 36 on which is articulated a track rod 40 of a steering device.

Figure 2:
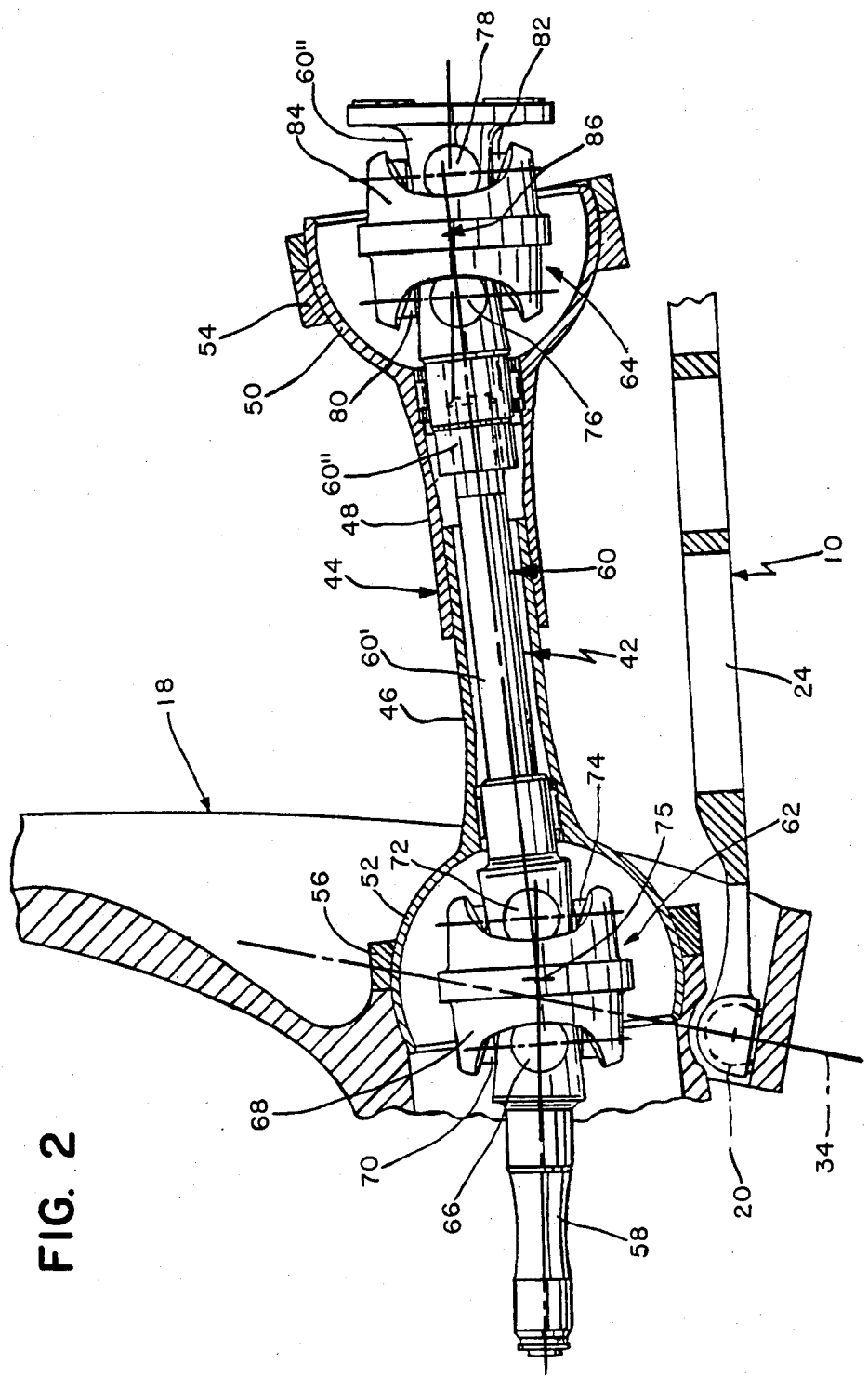
FIG. 2 is a partial, enlarged view of part of FIG. 1, with portions cut away.

As shown in FIG. 2, the wheel 12 is driven by means of an axle shaft which in preferred embodiments, is a double-jointed universal shaft 42 which is partly mounted in support tube 44 of telescopic design. Each tube part 46 and 48 of this support tube 44 is equipped at its free end with a spherical shell 50 and 52 respectively which are located on the body and wheel bearer side. Each shell 50 and 52 is in a bearing ring 54 and 56 respectively, which provide positive-contact, low-friction mountings which are water-resistant, maintenance-free and largely free from play.

The double-jointed universal shaft 42 includes a wheel shaft 58 mounted in the wheel bearer 18, a drive shaft 60 formed from two component shafts 60' and 60" arranged to be axially displaceable in one another, and two double universal joints 62 and 64. The support tube 44 radially supports the drive shaft 60 and also forms a casing for protecting the double-jointed universal shaft 42. The double universal joints 62 and 64 are located within the two spherical shells 52 and 54 respectively of the support tube 44. The wheel shaft 58 is articulated on a pair of joint pins 66 of a cross-link 70 mounted in the driving ring 68. The component shaft 60' of the drive shaft 60 is rotatably mounted in the tube part 46 of the support tube 44 and articulated on a pair of joint pins 72 of a second cross-link 74 mounted in the driving ring 68.

The articulation point 86 of the double universal joint 64 is interposed between shaft parts of the component shaft 60". The shaft parts are articulated on a pair of joint pins 76 and 78 of cross-links 80 and 82 respectively. The cross-links 80 and 82 are mounted in the driving ring 84 of this double universal joint.

The shaft part 60" on the body side is flanged onto an output shaft of a differential gear (not shown in detail). In the double universal joint 62, the joint pins 72 form the movable side of this joint 62, while the joint pins 66 articulated on the wheel shaft 58 which is fixedly axially mounted in the wheel bearer 18 forms the fixed side of the joint 62.

In the present invention, the double-jointed universal shaft 42 is arranged in the wheel suspension and the steering axle 34 is located on the wheel bearer side of the articulation point 75. This arrangement provides that the displacement inwards of the driving ring 68 and the movable side of the double universal joint 62, which normally occurs during the flexure of double-jointed universal shafts of this type during springing and/or steering movements, is considerably reduced. Consequently, longitudinal compensation of the drive shaft 60 and the support tube 44, which for this purpose are of telescopic design, is only necessary to be a negligible extent.

The displacement of the driving ring 68 towards the double universal joint 64 during flexure of the double universal joint 62 occurs when the wheel shaft 58 is pivoted about the articulation point 75 during joint flexure. This displacement during flexure is described in "Technical Application Comments for Double-Jointed Universal Shafts" (hereinafter referred to as "Comments") which is hereby incorporated by reference. For purposes of explanation, point A in FIG. 3 of the "Comments" corresponds to joint pin 66; point B in FIG. 3 corresponds to joint pin 72; point G to articulation point 75; 1 to wheel shaft 58; and 2 to component shaft 60'.

During the pivoting of the shaft 58, when the driving ring 68 is tilted, the joint pins 66 are displaced along a curve, having as its center point the articulation point 75. This causes the driving ring 68 to be axially displaced by a distance x (from B to B') as shown in FIG. 3 of the "Comments".

The following paragraphs explain how the desired reduction in the axial displacement of the driving ring 68 and the component shaft 60' is achieved during inwards and outwards spring movements of the wheel bearer 18. In this connection, the following assumptions are made.

Figure 3:
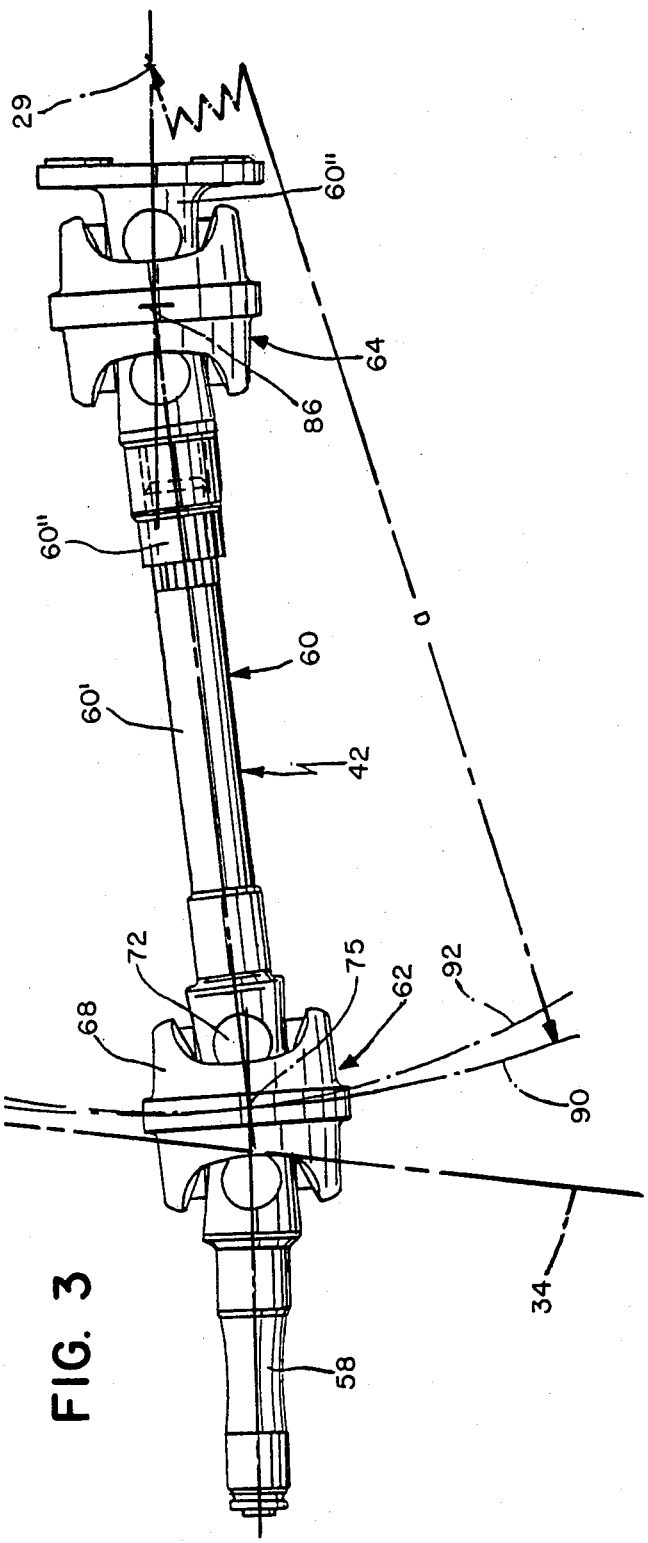
FIG. 3 is a view of the axle shaft schematically illustrating its movement.

If the instantaneous center of rotation 29 of the wheel suspension 10 coincides with the articulation point 86 of the double universal joint 64, the wheel bearer 18 and the articulation point 75 of the double universal joint 62 would move along a circular track curve 92, as illustrated in FIG. 3. This would cause the double universal joint 62 to flex and the driving ring 68 to tilt, with the driving ring 68 being displaced towards the double universal joint 64 as explained in the "Comments". This would result in detrimental relative movement between component shafts 60' and 60". During continually repeating spring movements, the entire double-jointed universal shaft would heat up on account of such displacements, which would lead to considerable wear in the area of those shaft parts which are displaceable in one another.

According to the invention, the relative movements between shafts 60' and 60" are now reduced to a minimum by the instantaneous center of rotation 29 being located, for example, on or in the area of the axis of the drive shaft of the differential gear allocated to the vehicle axle, the drive shaft being coupled to the body-side shaft part of the component shaft 60". The instantaneous center of rotation 29 is located at a distance "a" from the articulation point 75 of the double universal joint 62 on the wheel bearer side. This distance "a" is selected to be greater than the mutual distance between the two articulation points 75 and 86 of the two double universal joints 62 and 64.

During spring movement, the wheel bearer 18 executes a movement along a track curve 90 having as its center the instantaneous center of rotation 29. Also, the double universal joint 62, located on the wheel bearer 18, and the articulation point 75 of the double universal joint 62, move along the track curve 90.

The pivoting of the drive shaft 60 about the articulation point 86 of the double universal joint 64 does not impair the movement along the track curve 90, because a relative movement is possible between the two component shafts 60' and 60". However, because of the positioning of the instantaneous center of rotation 29 at an appropriate distance, as shown in FIG. 3, to the right of the inner double universal joint 64, the track curve 90 clearly runs substantially flatter than the track curve 92. The center point of track curve 92 is the articulation point 86. By forcing the articulation point 75 of the double universal joint 62 to follow the flatter curve 90, rather than curve 92, the axial displacing of the joint 62 as described in "Comments" and above, is largely compensated. Therefore, during repeated spring movement, the displacement of component shaft 60' relative to 60" is reduced to a negligible amount, depending on how the track curves 90 and 92 are related to one another.

This arrangement provides a connection between the two component shafts 60' and 60" which remains practically free from wear since wear-inducing effects at the drive shaft 60 will not act on the driving ring 68 of the double universal joint 62 due to the guidance of the wheel suspension.

Moreover, in preferred embodiments of the present invention, the wheel suspension is designed in such a way that even the pivoting of the wheel 12 about the steering axle 34 will not lead to disadvantageous displacements between the component shafts 60' and 60". This is achieved by arranging the steering axle 34 on the side of the double universal joint 62 which is remote from the drive shaft 60.

Figure 4:
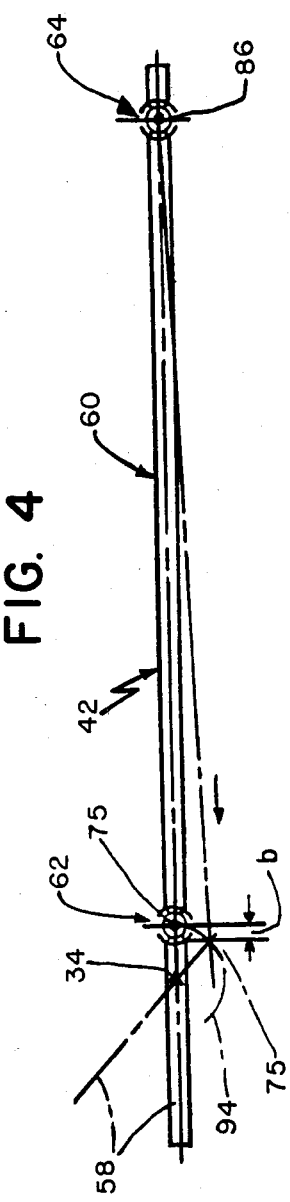
FIG. 4 is a plan schematic view of the embodiment of FIG. 1.

As illustrated in FIG. 4, the wheel shaft 58, during a wheel turn, pivots about the steering axle 34 which can have positive, negative, or zero inclinations. The embodiment illustrated shows the steering axle 34 intersecting the longitudinal axis of the wheel shaft 58. At the same time, the articulation point 75 of the double universal joint 62 moves along a circular path 94 having a center point located on the steering axle 34. The distance between the two articulation points 75 and 86 increases by the amount "b" during turning.

Consequently, the displacement path of component shaft 60' relative to 60" which normally occurs during the flexure of the double-jointed universal shaft can likewise be compensated or at least reduced by appropriate orientation of the wheel suspension.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A driven axle arrangement for a vehicle having independently guided wheels, which has a wheel guided by a wheel bearer, a wheel shaft mounted in the wheel bearer and a first double universal joint adjoining the wheel shaft, the first double universal joint having a movable side and a fixed side, the movable side being on the wheel bearer side of the first double universal joint, the movable side having an axial displacement path in the transverse direction of the vehicle which depends on the flexure angle of the first double universal joint, the axle also having axially displaceable drive shafts articulated between the first double universal joint and a second double universal joint, wherein the distance between a center of rotation of said wheel bearer and said first double universal joint is greater than the distance between said first and second double universal joints, whereby the axial displacement of the first double universal joint is substantially reduced during flexure of the first double universal joint.

2. An arrangement according to claim 1, wherein the center of rotation is defined by the intersection of the axes of upper and lower guide links articulated between the wheel bearer and a vehicle side wall.

3. An arrangement according to claim 1, wherein the wheel bearer is pivotable about a steering axle, said steering axle being arranged on the movable side of the first double universal joint.

* * * * *